United States Patent
Lin et al.

(10) Patent No.: US 11,613,237 B2
(45) Date of Patent: Mar. 28, 2023

(54) ANTI-LOCK BRAKING SYSTEM AND CONTROL METHOD THEREOF

(71) Applicant: Automotive Research & Testing Center, Changhua Hsien (TW)

(72) Inventors: Hsin-Chuan Lin, Changhua Hsien (TW); Hsuan-Yung Chang, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 304 days.

(21) Appl. No.: 17/030,180

(22) Filed: Sep. 23, 2020

(65) Prior Publication Data

US 2022/0089133 A1 Mar. 24, 2022

(51) Int. Cl.
| | |
|---|---|
| *B60T 8/1761* | (2006.01) |
| *B60T 8/171* | (2006.01) |
| *B60T 8/172* | (2006.01) |
| *B60T 13/68* | (2006.01) |
| *B60T 8/34* | (2006.01) |

(52) U.S. Cl.
CPC ............ *B60T 8/1761* (2013.01); *B60T 8/171* (2013.01); *B60T 8/172* (2013.01); *B60T 8/341* (2013.01); *B60T 13/68* (2013.01); *B60T 2230/02* (2013.01); *B60T 2250/04* (2013.01)

(58) Field of Classification Search
CPC ........ B60T 8/1761; B60T 8/171; B60T 8/172; B60T 8/341; B60T 13/68; B60T 2230/02; B60T 2250/04
See application file for complete search history.

(56) References Cited

U.S. PATENT DOCUMENTS

| | | | | |
|---|---|---|---|---|
| 5,063,514 A | * | 11/1991 | Headley | B60T 8/1755 303/169 |
| 5,423,601 A | * | 6/1995 | Sigl | B60T 8/175 701/79 |
| 2008/0221768 A1 | * | 9/2008 | Salamat | B60T 8/325 303/166 |

OTHER PUBLICATIONS

Song, Chui Ki, Vehicle Speed Estimation Using Accelerometer and Wheel Speed Measurements, SAE Technical Paper Series, reprinted from Proceedings of the 2002 SAE International Body Engineering Conference and Automotive & Transportation Technology Conference on CD-ROM (IBAT2002CD), Jul. 9-11, 2002, 10 pages.

* cited by examiner

*Primary Examiner* — Kenneth J Malkowski
*Assistant Examiner* — Andrew J Cromer
(74) *Attorney, Agent, or Firm* — Bradley J. Thorson; DeWitt LLP (57) ABSTRACT

An Anti-lock Braking System and control method are disclosed. The control method is performed after a control module intervenes a vehicle's braking system and comprises: receiving a wheel speed signal of a wheel and a vehicle acceleration signal; computing a tire-slip feedback value according to the wheel speed signal of the wheels and the vehicle acceleration signal; generating a feedback control voltage according to a tire-slip difference between a tire-slip target value and the tire-slip feedback value; generating a tire-slip compensation value by performing a differential compensation to the tire-slip feedback value; obtaining a feedforward voltage according to the tire-slip compensation value via a look-up table approach; generating a braking control voltage by adding the feedback control voltage to the feedforward voltage; and outputting the braking control voltage to a proportioning-valve brake, such (Continued)

that the proportioning-valve brake adjusts a braking pressure according to the braking control voltage.

10 Claims, 11 Drawing Sheets

ANTI-LOCK BRAKING SYSTEM AND CONTROL METHOD THEREOF

BACKGROUND OF THE INVENTION

1. Field of the Invention

The present application relates generally to a braking system and method, and more particularly to an Anti-lock Braking System (ABS) and control method thereof.

2. Description of Related Art

Figure 10:
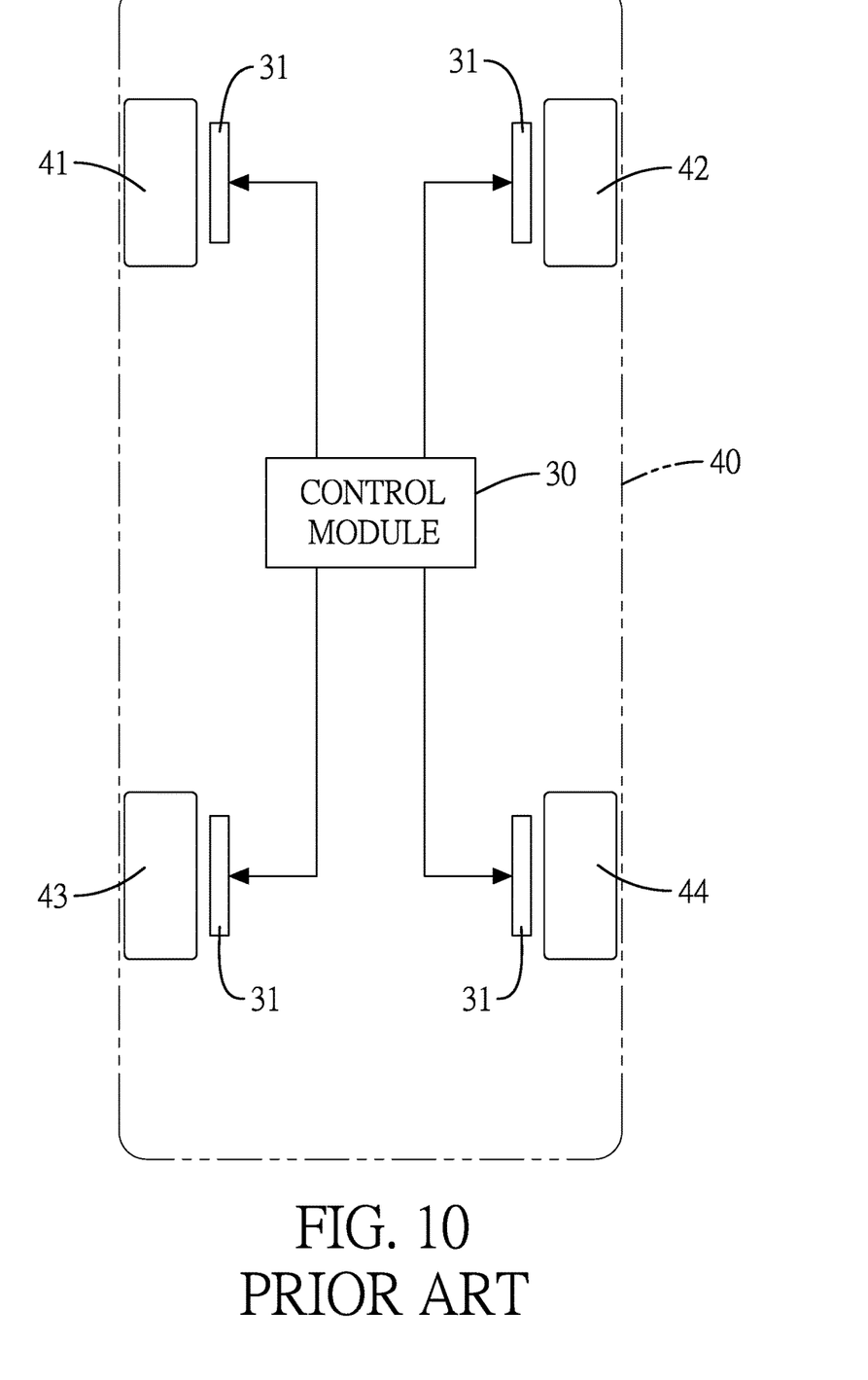
FIG. 10 is a schematic diagram of a conventional Anti-lock Braking System applied to a car.

With reference to FIG. 10, a conventional Anti-lock Braking System (ABS) comprises a solenoid-valve braking module and a control module 30. For example, a car 40 may include a left-front wheel 41, a right-front wheel 42, a left-rear wheel 43, and a right-rear wheel 44. Correspondingly, the solenoid-valve braking module includes four solenoid-valve brakes 31. The control module 30 is electrically connected to and controls the solenoid-valve brakes 31 to adjust braking pressures exerted on the wheels. In addition, the control module 30 is electrically connected to multiple sensors of the car 40, such as a wheel speed sensor, an accelerometer, etc. to acquire driving information (such as wheel speed, car speed, acceleration, etc.) of the car 40.

A conventional control method of ABS is described as follows. The control module 30 at first determines whether a braking event, such as when a brake pedal of the car 40 is pressed down, occurs. When the braking event is occurring, the control module 30 further determines whether a car state meets an early warning condition. For example, the car state may include a measured wheel acceleration, and the early warning condition may include a threshold. Besides, in general, a tire slip is a difference between the car speed and the wheel speed and will be represented as:

$$\text{tire slip}(\%) = \frac{|\text{car speed} - \text{wheel speed}|}{\text{car speed}} \times 100(\%)$$

When the tire slip is too high, the car 40 will slip on the road. Hence, when the control module 30 determines the car state meets the early warning condition (the measured wheel acceleration is lower than the threshold), the control module 30 actively intervenes a braking system of the car 40 to automatically control the solenoid-valve braking module. Meanwhile, a braking action of the car 40 is controlled by the control module 30 in order to automatically adjust the wheel speed and slow down the increase of the tire slip, so as to prevent the wheels from rapidly locked up and to stabilize a motion of the car.

After the control module 30 intervenes the braking system of the car 40, the control module 30 drives each one of the solenoid-valve brakes 31 to intermittently operate in a relieving state and a locking state. When each one of the solenoid-valve brake 31 operates in the relieving state, brake oil passes through an oil-pressure valve to relieve pressure, such that the braking pressure becomes zero. On the contrary, when the solenoid-valve brake 31 operates in the locking state, the brake oil passes through the oil-pressure valve to enhance pressure, so as to provide the braking pressure by the solenoid-valve brake 31. However, the conventional ABS has the following defects:

1. Each one of the solenoid-valve brakes 31 intermittently operates in the relieving state and the locking state. In the process of changing the relieving state and the locking state, the oil-pressure valve of each one of the solenoid-valve brakes 31 sustains impact of the oil pressure (like a water hammer effect), and the solenoid-valves brakes 31 will be damaged easily.

2. After the control module 30 intervenes the braking system of the car 40, each one of the solenoid-valve brakes 31 intermittently operates in the relieving state and the locking state (two states only), such that the wheel speeds of the wheels become fast and slow suddenly. As a result, the sudden changes of the wheel speeds will make the driver or the passengers have a feeling of intermittent and rapid vibrations, such that the driver or the passengers will feel uncomfortable.

SUMMARY OF THE INVENTION

An objective of the present invention is to provide an Anti-lock Braking System and control method thereof to overcome the aforementioned defects.

The Anti-lock Braking System of the present invention is adapted to a vehicle with multiple wheels and comprises:

an accelerometer outputting a vehicle acceleration signal reflecting acceleration of the vehicle;

multiple wheel speed sensors respectively corresponding to the multiple wheels and each one of the wheel speed sensors outputting a wheel speed signal;

multiple proportioning-valve brakes respectively corresponding to the multiple wheels and each one of the proportioning-valve brakes receiving a braking control voltage to adjust a braking pressure of each one of the wheels according to a magnitude of the braking control voltage; and a control module electrically connected to the accelerometer, the wheel speed sensors, and the proportioning-valve brakes; wherein after the control module intervenes a braking system of the vehicle, the control module generates the braking control voltages for the proportioning-valve brakes respectively according to the vehicle acceleration signal and the wheel speed signals;

wherein the control module computes a tire-slip feedback value according to the wheel speed signal of each one of the wheel speed sensors and the vehicle acceleration signal, generates a feedback control voltage according to a tire-slip difference between a tire-slip target value and the tire-slip feedback value, generates a tire-slip compensation value by performing a differential compensation to the tire-slip feedback value, obtains a feedforward voltage according to the tire-slip compensation value via a look-up table approach, and generates the braking control voltage by adding the feedback control voltage to the feedforward voltage.

The anti-lock braking control method of the present invention is performed after a control module intervenes a braking system of a vehicle with multiple wheels and comprises:

receiving a wheel speed signal of each one of the wheels and a vehicle acceleration signal;

computing a tire-slip feedback value according to the wheel speed signal of each one of the wheels and the vehicle acceleration signal;

generating a feedback control voltage according to a tire-slip difference between a tire-slip target value and the tire-slip feedback value;

generating a tire-slip compensation value by performing a differential compensation to the tire-slip feedback value;

obtaining a feedforward voltage according to the tire-slip compensation value via a look-up table approach;

generating a braking control voltage by adding the feedback control voltage to the feedforward voltage; and outputting the braking control voltage to a proportioning-valve brake, such that the proportioning-valve brake adjusts a braking pressure of each one of the wheels according to a magnitude of the braking control voltage.

Compared with the conventional ABS, the present invention has at least advantages as follows:

1. In comparison with the solenoid-valve brakes 31 in the conventional ABS, the proportioning-valve brakes of the present invention do not operate in the relieving state and the locking state only. The braking pressure provided by the proportioning-valve brake is varied with the braking control voltage, such that the braking pressure of the present invention will be precisely adjusted to efficiently decrease the impact of oil pressure exerted on the proportioning-valve brake. The proportioning-valve brake in the present invention is more durable than the solenoid-valves brake in the conventional ABS.

2. The present invention may precisely adjust the braking pressures exerted on the wheels. The braking control voltage includes the voltage component of the feedforward voltage. In this way, the feedforward voltage provides an assistance to decrease the variation of each one of the wheel speeds for improving the vibration phenomenon of each one of the wheel speeds. As a result, the present invention may prevent the driver or the passengers from a feeling of intermittent and rapid vibrations, such that the driver or the passengers would not feel uncomfortable.

DETAILED DESCRIPTION OF PREFERRED EMBODIMENT(S)

Figure 1:
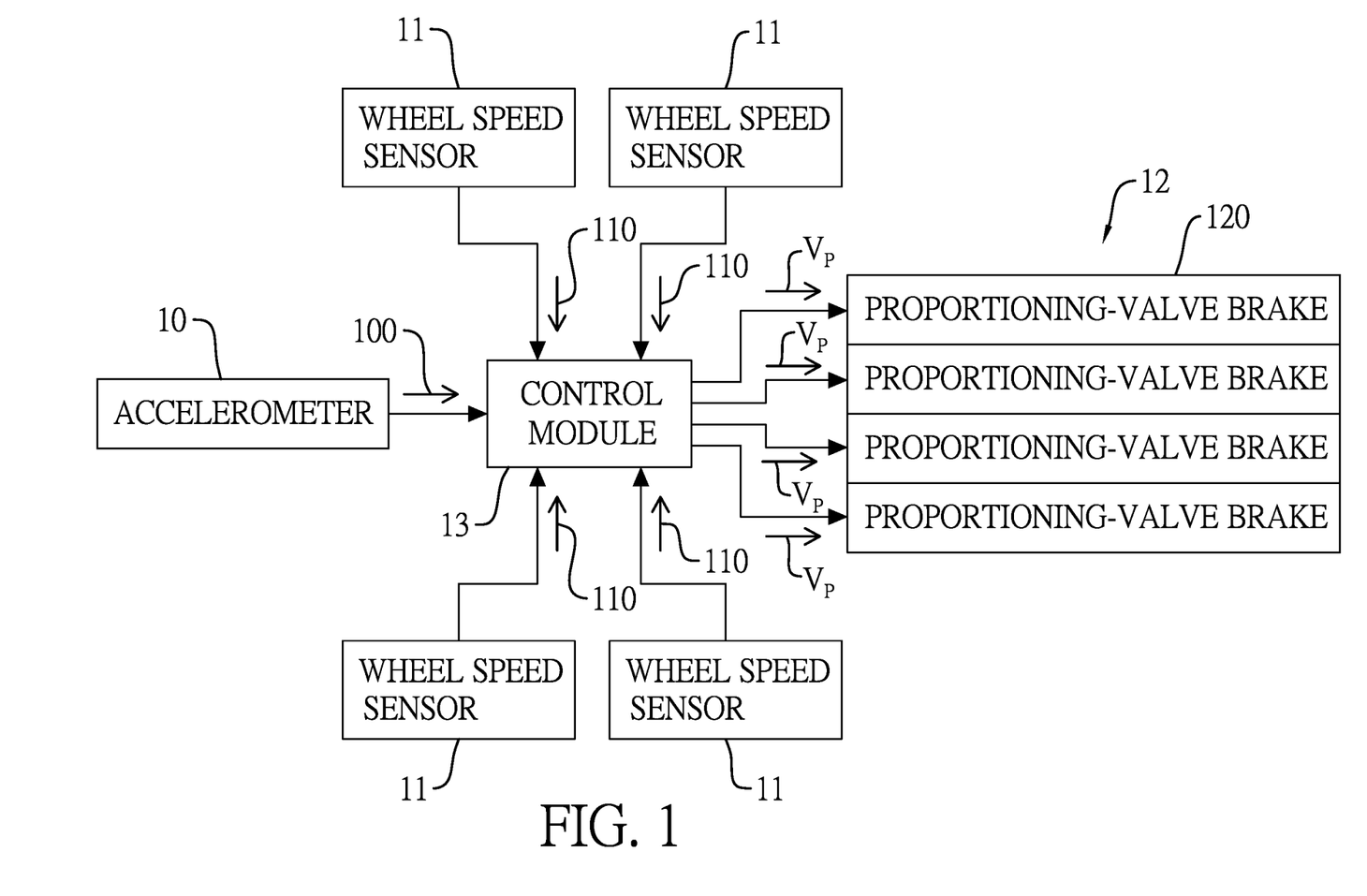
FIG. 1 is a block diagram of an embodiment of the Anti-lock Braking System of the present invention.
Figure 2:
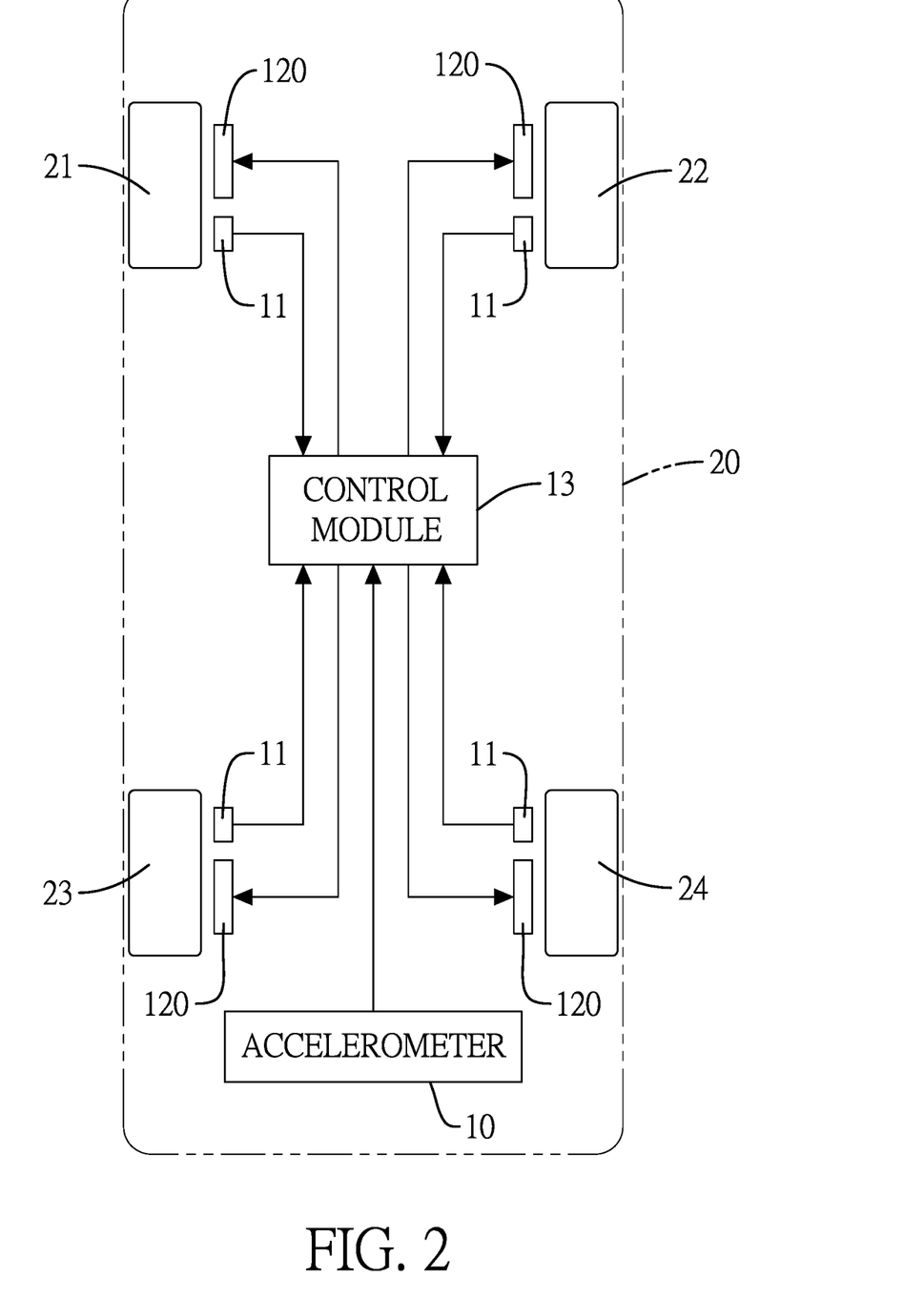
FIG. 2 is a schematic diagram of the Anti-lock Braking System of the present invention applied to a vehicle.

With reference to FIGS. 1 and 2, the Anti-lock Braking System (ABS) of the present invention comprises an accelerometer 10, multiple wheel speed sensors 11, a braking module 12, and a control module 13. For example, the Anti-lock Braking System of the present invention may be applied to a vehicle 20 (such as a car). The vehicle 20 has multiple wheels. The braking module 12 has multiple proportioning-valve brakes 120 respectively corresponding to the multiple wheels. Each one of the proportioning-valve brakes 120 is configured to provide and adjust a braking pressure exerted on the corresponding wheel.

With reference to FIG. 2, the multiple wheels of the vehicle 20 may include, but not limited to, multiple front wheels and multiple rear wheels. The front wheels may include a left-front wheel 21 and a right-front wheel 22. The rear wheels may include a left-rear wheel 23 and a right-rear wheel 24.

Correspondingly, the braking module 12 may include four proportioning-valve brakes 120 to respectively adjust the braking pressures of the left-front wheel 21, the right-front wheel 22, the left-rear wheel 23, and the right-rear wheel 24.

With reference to FIG. 1, the working principle of the accelerometer 10, the wheel speed sensors 11, the braking module 12, and the proportioning-valve brakes 120 is common knowledge in the related art and thus would not be described in detail.

In brief, the accelerometer 10 outputs a vehicle acceleration signal 100 reflecting acceleration of the vehicle 20. For example, when the vehicle 20 is accelerating (vehicle speed is increasing), the vehicle 20 has positive acceleration and therefore the vehicle acceleration signal 100 corresponds to a positive value. Inversely, when the vehicle 20 is decelerating (vehicle speed is decreasing), the vehicle 20 has negative acceleration and therefore the vehicle acceleration signal 100 corresponds to a negative value. In other words, the vehicle acceleration signal 100 of the vehicle 20 having negative acceleration may be also defined/called as a vehicle deceleration signal.

The wheel speed sensors 11 respectively correspond to the multiple wheels. Each one of the wheel speed sensors 11 respectively outputs a wheel speed signal 110. The wheel speed signal 110 reflects the wheel's speed. Each one of the proportioning-valve brakes 120 receives a braking control voltage $V_P$ to adjust the braking pressure of the wheel according to a magnitude of the braking control voltage V. When the magnitude of the braking control voltage $V_P$ is higher, the braking pressure provided by the proportioning-valve brakes 120 is lower. In other words, increasing the magnitude of the braking control voltage $V_P$ may relieve the braking pressure provided by the proportioning-valve brakes 120, and decreasing the magnitude of the braking control voltage $V_P$ may increase the braking pressure provided by the proportioning-valve brakes 120

For example, the control module 13 may have control integrated circuit (IC) chips to perform the control method of the present invention. With reference to FIGS. 1 and 2, the control module 13 is electrically connected to the accelerometer 10, the wheel speed sensors 11, and the proportioning-valve brakes 120. The control module 13 generates the braking control voltages $V_P$ for the proportioning-valve brakes 120 respectively according to the vehicle acceleration signal 100 of the accelerometer 10 and the wheel speed signals 110 of the wheel speed sensors 11, thereby respectively adjusting the braking pressures of the wheels. The following example discloses the control method to one of the wheels, and the control method to the rest of the wheels may be referred to it. Hence, in general, the left-front wheel 21, the right-front wheel 22, the left-rear wheel 23, and the right-rear wheel 24 of the vehicle 20 are individually controlled to effectively shorten a braking distance and improve the braking efficiency.

Figure 3:
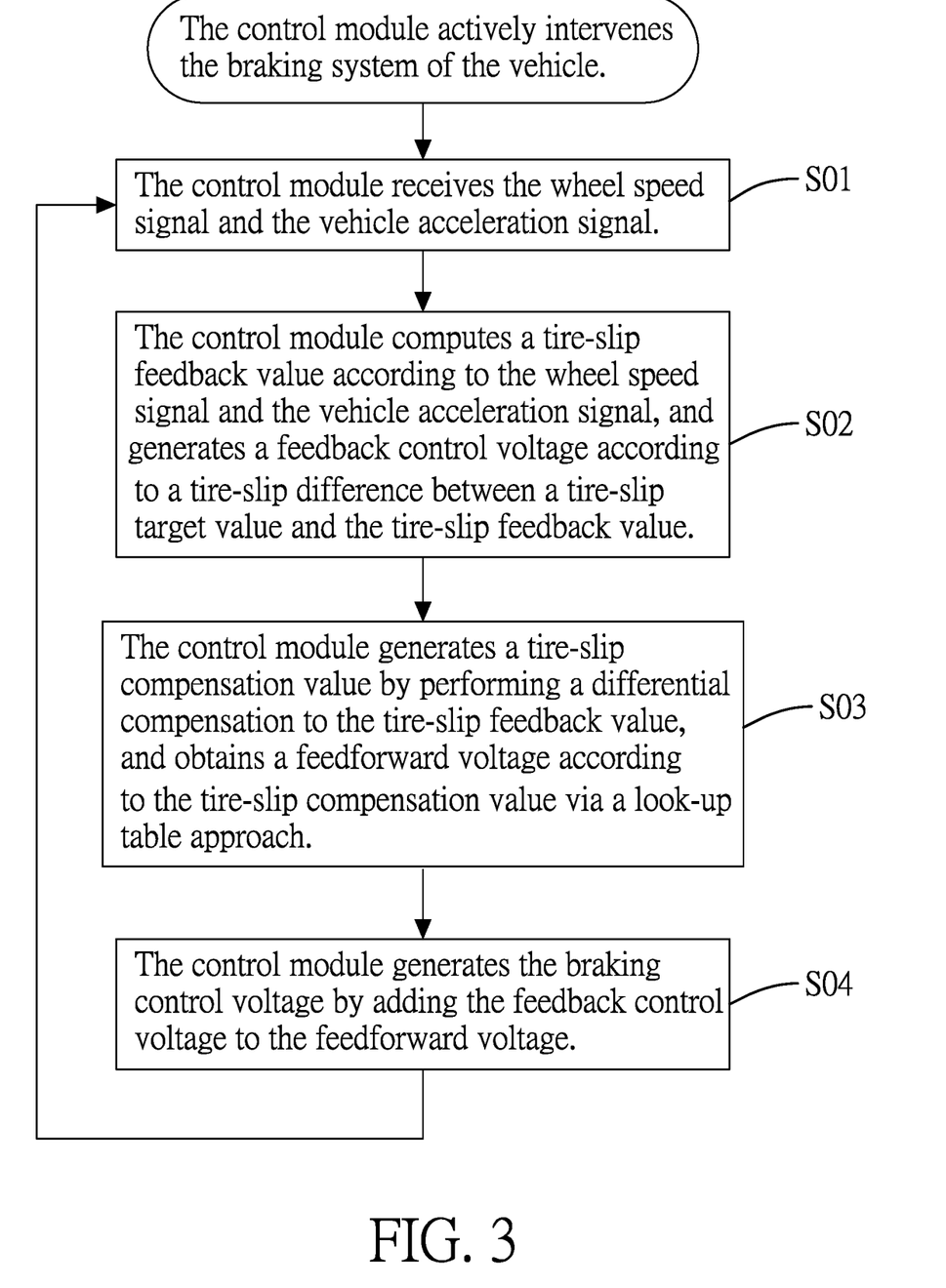
FIG. 3 is a flow chart of an embodiment of the anti-lock braking control method of the present invention.

With reference to FIGS. 1-3, the control method of the present invention is performed in the control module 13. The control method of the present invention is performed after the control module 13 intervenes a braking system of the vehicle 20. As a conventional Anti-lock Braking System, the conditions to intervene the braking system of the vehicle 20 in the present invention are common knowledge in the related art and would not be described in detail.

Figure 4:
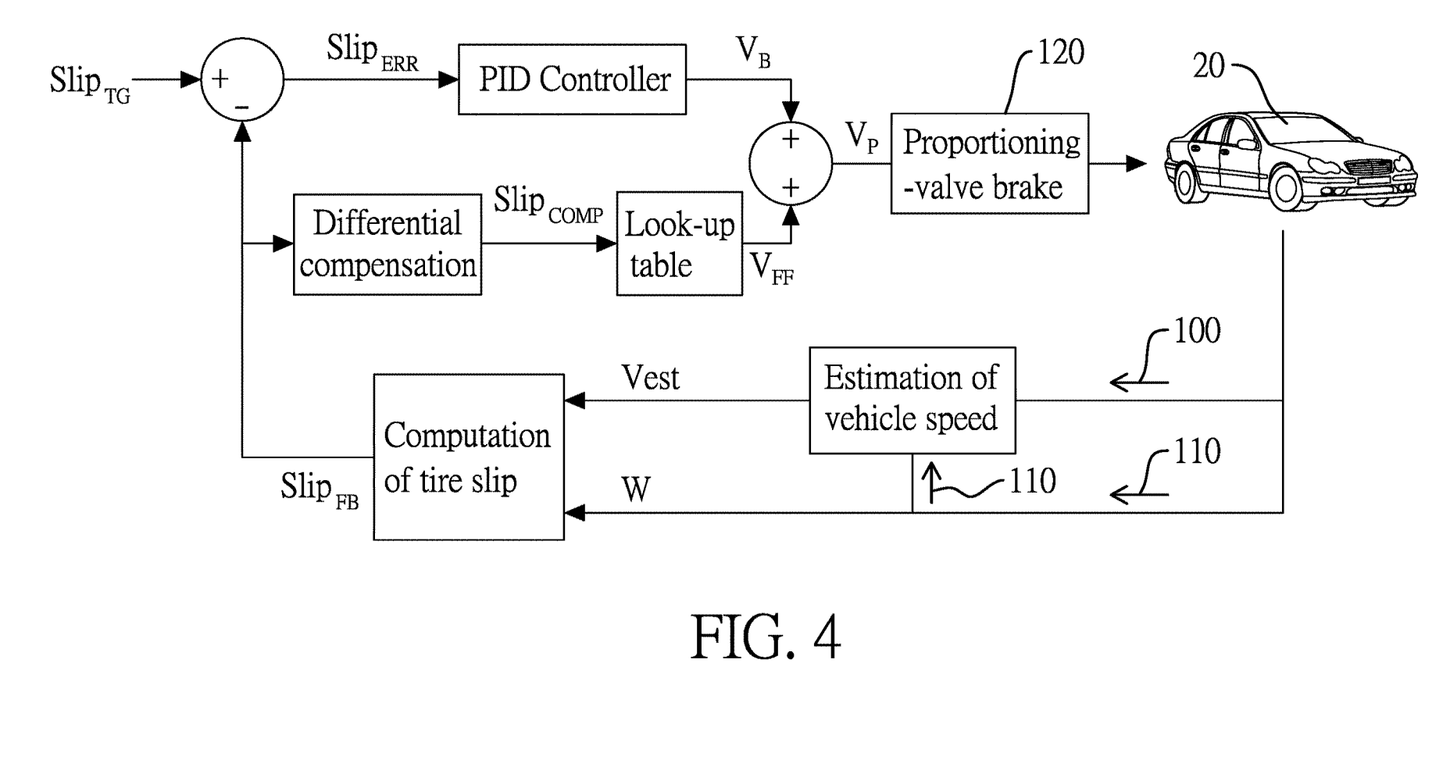
FIG. 4 is a schematic diagram depicting the braking control voltage provided to the proportioning-valve brake.

With reference to FIGS. 3 and 4, the anti-lock braking control method of the present invention comprises the following STEPs.

STEP S01: The control module 13 receives the wheel speed signal 110 and the vehicle acceleration signal 100. As aforementioned, the wheel speed signal 110 is received from the wheel speed sensor 11 and reflects a real-time wheel speed. The vehicle acceleration signal 100 is received from the accelerometer 10 and reflects a real-time acceleration of the vehicle 20.

STEP S02: The control module 13 computes a tire-slip feedback value $Slip_{FB}$ according to the wheel speed signal 110 and the vehicle acceleration signal 100, and generates a feedback control voltage $V_B$ according to a tire-slip difference $Slip_{ERR}$ between a tire-slip target value $Slip_{TG}$ and the tire-slip feedback value $Slip_{FB}$. In the embodiment of the present invention, the tire-slip feedback value $Slip_{FB}$ may be represented as:

$$Slip_{FB} = \frac{V_{est} - W}{V_{est}}$$

In the above equation, $V_{est}$ is the speed of the vehicle 20 and W is the wheel's speed computed from the wheel speed signal 110 of the wheel speed sensor 11, wherein W may be represented as:

$$W = \frac{v_{rpm} \times 2\pi r}{60} \times \frac{60 \times 60}{1000} \left(\frac{\text{kilometer}}{\text{hour}}\right) = \frac{v_{rpm} \times 2\pi r}{60} \left(\frac{\text{meter}}{\text{second}}\right)$$

In the above equation, $v_{rpm}$ is the wheel speed signal 110 and reflects a number of revolutions of the wheel per minute detected by the wheel speed sensor 11, and r is a radius of the wheel and a unit of the radius may be meter (m) as an example.

In the embodiment of the present invention, $V_{est}$ is a function including time (t) and may be represented as:

$$\hat{v}(k) = K_2 r_{est} \omega(k) + (1-K_2)([1] \cdot \hat{v}(k-1) + [dt]a_{meas}(k))$$

The above equation is quoted from a published document of Society of Automotive Engineers (SAE) as below:

| | |
|---|---|
| Document Number | SAE TECHNICAL PAPER SERIES 2002-01-2229 |
| title | Vehicle Speed Estimation Using Accelerometer and Wheel Speed Measurements |

In the above equation, $V_{est}=\hat{v}(k)$ and k is a time point of the data, for example, $\hat{v}(k)$ may be an instant vehicle speed at that time point and $\hat{v}(k-1)$ is the vehicle speed at a previous time point; $K_2$ is a value of weight and $0 \leq K_2 \leq 1$; $r_{est}$ is the radius of the wheel; $\omega(k)$ is the wheel speed and $W=\omega(k)$; $a_{meas}$ is the acceleration of the vehicle 20 (such as the vehicle acceleration signal 100). In brief, $V_{est}$ is an estimated value computed according to the wheel speed signal 110 and the vehicle acceleration signal 100. $K_2$ is used to determine whether $V_{est}$ more depends on W or $a_{meas}$.

The tire-slip target value $Slip_{TG}$ is a predetermined value that the control method of the present invention wants to achieve. For example, the tire-slip target value $Slip_{TG}$ may be lower than or equal to 20%, but not limited to 20%. Hence, the tire-slip difference $Slip_{ERR}$ may be represented as:

$$Slip_{ERR} = Slip_{TG} - Slip_{FB}$$

Figure 5:
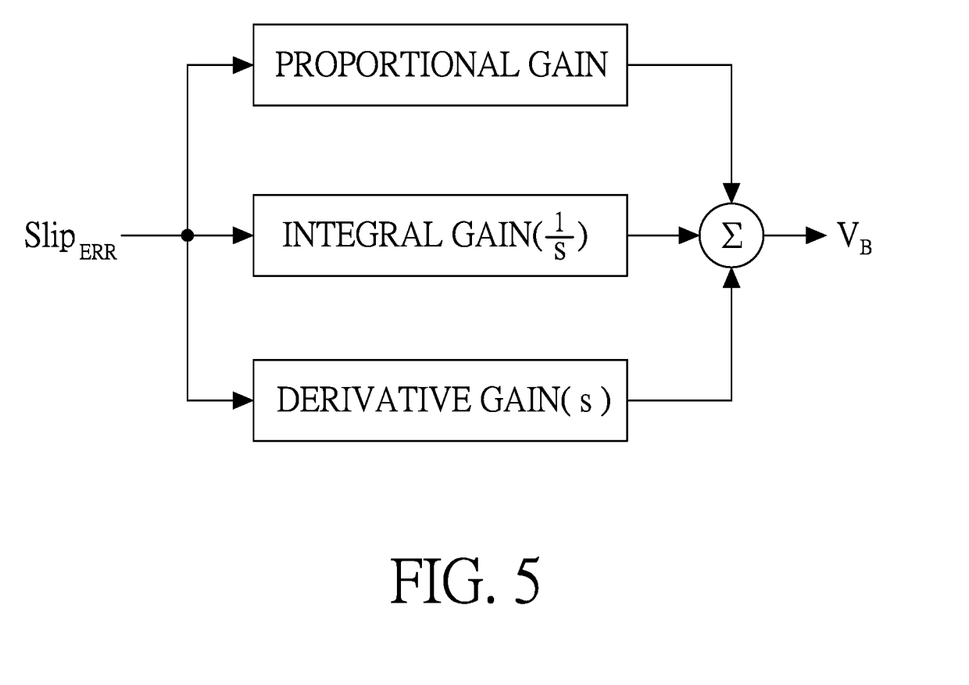
FIG. 5 is a schematic diagram of computation at S-domain performed by the PID controller.

The control module 13 generates the feedback control voltage $V_B$ according to the tire-slip difference $Slip_{ERR}$ via a proportional-integral-derivative (PID) controller. The PID controller is common knowledge in the related art. FIG. 5 is an example of the PID controller that is based on a typical control configuration to perform a computation of a minimized error and output a correction value, and thus the typical control configuration of FIG. 5 would not be described in detail. For a preferred instance, a proportional gain of the PID controller may be in a range between 0 and 5 (including 0 and 5), an integral gain of the PID controller may be in a range between 0 and 1 (including 0 and 1), and a derivative gain of the PID controller may be in a range between 0 and 1 (including 0 and 1).

STEP S03: The control module 13 generates a tire-slip compensation value $Slip_{COMP}$ by performing a differential compensation to the tire-slip feedback value $Slip_{FB}$, and obtains a feedforward voltage $V_{FF}$ according to the tire-slip compensation value $Slip_{COMP}$ via a look-up table approach. In the embodiment of the present invention, the tire-slip compensation value $Slip_{COMP}$ may be represented as:

$$Slip_{COMP} = Slip_{FB} + C \times \frac{d}{dt}(Slip_{FB})$$

In the above equation, C is a value of weight and $0 \leq C \leq 1$. Different wheels may correspond to different values of C. For example, C for the front wheels (including the left-front wheel 21 and the right-front wheel 22) is higher than C for the rear wheels (including the left-rear wheel 23 and the right-rear wheel 24). For a preferred instance, C for the front wheels may be (but not limited to be) 0.6 and C for the rear wheels may be (but not limited to be) 0.1.

Regarding the look-up table approach, the control module 13 stores at least one look-up table for performing the look-up table approach. The look-up table includes a voltage lower limit, a voltage upper limit, a tire-slip lower-limit, and a tire-slip upper limit. In the look-up table, one of the tire-slip compensation values $Slip_{COMP}$ corresponds to one of the feedforward voltages $V_{FF}$. The feedforward voltage $V_{FF}$ may be between 0 Volt (V) and 10V ($0V \leq V_{FF} \leq 10V$). In general, an operation voltage of each one of the proportioning-valve brakes 120 may be in a range between 3.5V and 9V (including 3.5V and 9V). When the tire-slip compensation value $Slip_{COMP}$ is higher, the feedforward voltage $V_{FF}$ is higher accordingly. Hence, the tire-slip compensation value $Slip_{COMP}$ may be directly proportional to the feedforward voltage $V_{FF}$.

In the embodiment of the present invention, the control module 13 stores multiple look-up tables including a first look-up table and a second look-up table. The first look-up table corresponds to the front wheels. The second look-up table corresponds to the rear wheels.

Figure 6:
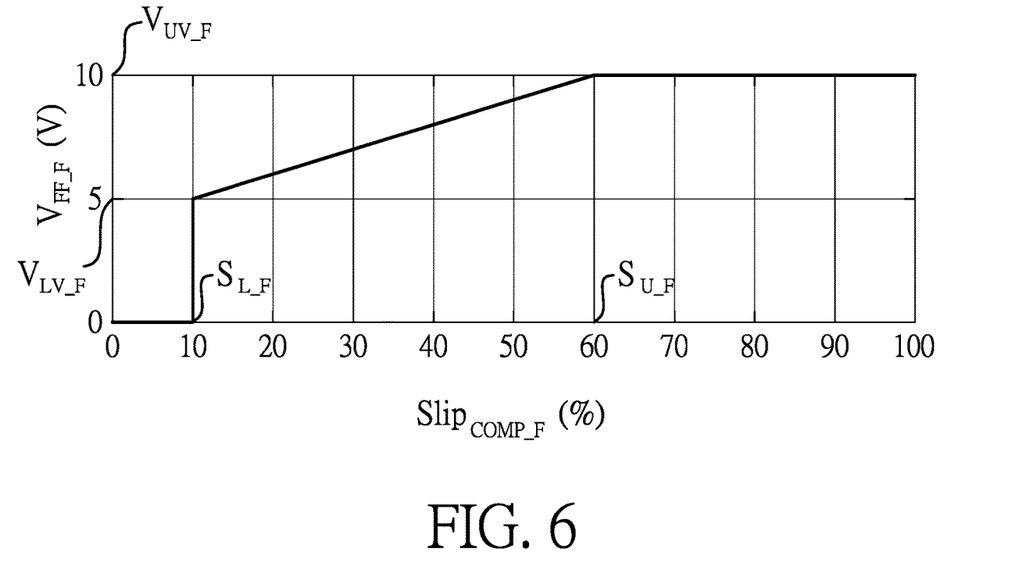
FIG. 6 is a schematic diagram of a first look-up table in the present invention.

FIG. 6 depicts the data of the first look-up table and is described in detail as follows. The tire-slip compensation value $Slip_{COMP}$, computed according to the vehicle acceleration value 110 and the wheel speed signal 110 of the left-front wheel 21 or the right-front wheel 22 as shown in FIG. 1, is defined as a first tire-slip compensation value $Slip_{COMP\_F}$. The feedforward voltage $V_{FF}$ corresponding to the left-front wheel 21 and the right-front wheel 22 is defined as a first feedforward voltage $V_{FF\_F}$. When the first tire-slip compensation value $Slip_{COMP\_F}$ is equal to a first tire-slip lower limit $S_{L\_F}$ (such as 10%), the first feedforward voltage $V_{FF\_F}$ is equal to a first voltage lower limit $V_{LV\_F}$ (such as 5V) accordingly. When the first tire-slip compensation value $Slip_{COMP\_F}$ is equal to a first tire-slip upper limit $S_{U\_F}$ (such as 60%), the first feedforward voltage $V_{FF\_F}$ is equal to a first voltage upper limit $V_{UV\_F}$ (such as 10V) accordingly. When $Slip_{COMP\_F} < S_{L\_F}$, the first feedforward voltage $V_{FF\_F}$ is equal to 0V accordingly. When $S_{L\_F} < Slip_{COMP\_F} < S_{U\_F}$, the first tire-slip compensation value $Slip_{COMP\_F}$ is linearly and directly proportional to the first feedforward voltage $V_{FF\_F}$ and $V_{LV\_F} < V_{FF\_F} < V_{UV\_F}$. When $Slip_{COMP\_F} > S_{U\_F}$, the first feedforward voltage $V_{FF\_F}$ is equal to the first voltage upper limit $V_{UV\_F}$ accordingly. In order to avoid insufficient relieving of the braking pressure, the first voltage upper limit $V_{UV\_F}$ may be higher than a maximum value of the range of the operation voltage of each one of the proportioning-valve brakes 120. As mentioned above, the range of the operation voltage of the proportioning-valve brake 120 may be between 3.5V and 9V, such that the first voltage upper limit $V_{UV\_F}$ may be set as 10V.

In the embodiment of the present invention, based on the parameter configuration set to the control module 13, the first look-up table includes the first voltage lower limit $V_{LV\_F}$, the first voltage upper limit $V_{UV\_F}$, the first tire-slip lower limit $S_{L\_F}$, and the first tire-slip upper limit $S_{U\_F}$. When the first tire-slip compensation value $Slip_{COMP\_F}$ is between the first tire-slip lower limit $S_{L\_F}$ and the first tire-slip upper limit $S_{U\_F}$, the linearly and directly proportional relation between the first tire-slip compensation value $Slip_{COMP\_F}$ and the first feedforward voltage $V_{FF\_F}$ is determined.

Figure 7:
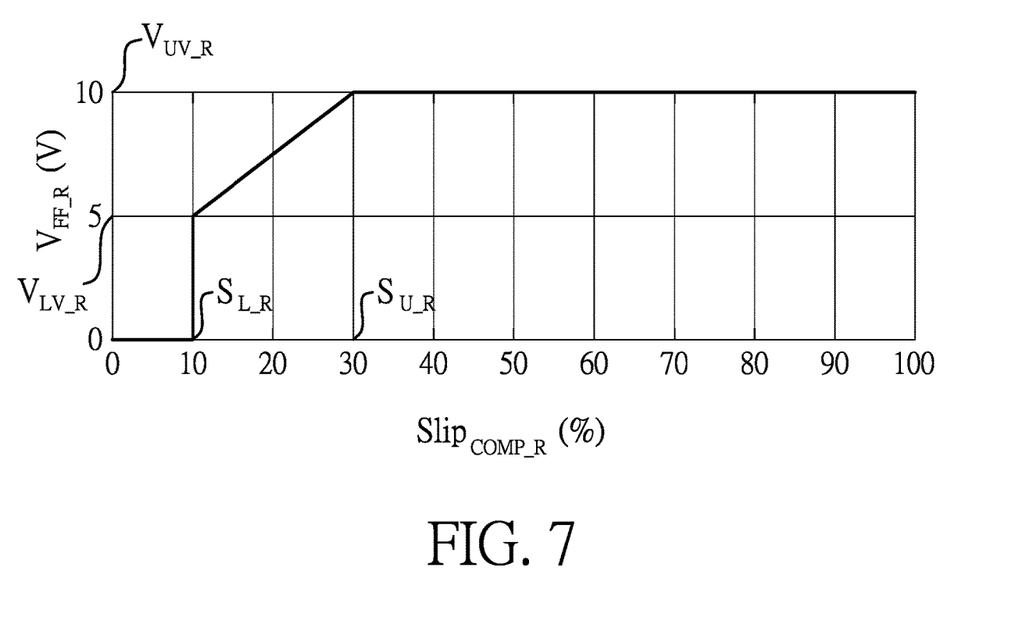
FIG. 7 is a schematic diagram of a second look-up table in the present invention.

FIG. 7 depicts the data of the second look-up table and is described in detail as follows. The tire-slip compensation value $Slip_{COMP}$, computed according to the vehicle acceleration value 110 and the wheel speed signal 110 of the left-rear wheel 23 or the right-rear wheel 24 as shown in FIG. 1, is defined as a second tire-slip compensation value $Slip_{COMP\_R}$. The feedforward voltage $V_{FF}$ corresponding to the left-rear wheel 23 and the right-rear wheel 24 is defined as a second feedforward voltage $V_{FF\_R}$. When the second tire-slip compensation value $Slip_{COMP\_R}$ is equal to a second tire-slip lower limit $S_{L\_R}$ (such as 10%), the second feedforward voltage $V_{FF\_R}$ is equal to a second voltage lower limit $V_{LV\_R}$ (such as 5V) accordingly. When the second tire-slip compensation value $Slip_{COMP\_R}$ is equal to a second tire-slip upper limit $S_{U\_R}$ (such as 30%), the second feedforward voltage $V_{FF\_R}$ is equal to a second voltage upper limit $V_{UV\_R}$ (such as 10V) accordingly. When $Slip_{COMPR} < S_{L\_R}$, the second feedforward voltage $V_{FF\_R}$ is equal to 0V accordingly. When $S_{L\_R} < Slip_{COMP\_R} < S_{U\_R}$, the second tire-slip compensation value $Slip_{COMPR}$ is linearly and directly proportional to the second feedforward voltage $V_{FF\_R}$ and $V_{LV\_R} < V_{FF\_R} < V_{UV\_R}$. When $Slip_{COMPR} > S_{U\_R}$, the second feedforward voltage $V_{FF\_R}$ is equal to the second voltage upper limit $V_{UV\_R}$ accordingly. Similarly, in order to avoid insufficient relieving of the braking pressure, the second voltage upper limit $V_{UV\_R}$ may be set as 10V.

In the embodiment of the present invention, based on the parameter configuration set to the control module 13, the second look-up table includes the second voltage lower limit $V_{LV\_R}$, the second voltage upper limit $V_{UV\_R}$, the second tire-slip lower limit $S_{L\_R}$, and the second tire-slip upper limit $S_{U\_R}$. When the second tire-slip compensation value $Slip_{COMP\_R}$ is between the second tire-slip lower limit $S_{L\_COMP\_R}$ and the second tire-slip upper limit $S_{U\_R}$, the linearly and directly proportional relation between the second tire-slip compensation value $Slip_{COMP\_R}$ and the second feedforward voltage $V_{FF\_R}$ is determined.

STEP S04: The control module 13 generates the braking control voltage $V_P$ by adding the feedback control voltage $V_B$ to the feedforward voltage $V_{FF}$. The braking control voltage $V_P$ may be represented as:

$$V_P = V_B + V_{FF}$$

In the embodiment of the present invention, the braking control voltage $V_P$ corresponding to the front wheels is defined as a first braking control voltage $V_{P\_F}$ represented as:

$$V_{P\_F} = V_B + V_{FF\_F}$$

The braking control voltage $V_P$ corresponding to the rear wheels is defined as a second braking control voltage $V_{P\_R}$ represented as:

$$V_{P\_R} = V_B + V_{FF\_R}$$

In conclusion, the control module 13 outputs the first braking control voltage $V_{P\_F}$ to control the proportioning-valve brakes 120 of the front wheels (such as the left-front wheel 21 or the right-front wheel 22). Besides, the control module 13 also outputs the second braking control voltage $V_{P\_R}$ to control the proportioning-valve brakes 120 of the rear wheels (such as the left-rear wheel 23 or the right-rear wheel 24). The braking control voltage $V_{P\_F}$, $V_{P\_R}$ includes a voltage component of the feedforward voltage $V_{FF\_F}$, $V_{FF\_R}$. The feedforward voltage $V_{FF\_F}$, $V_{FF\_R}$ is computed from the tire-slip compensation value $Slip_{COMP\_F}$, $Slip_{COMP\_R}$. FIGS. 8A, 8B, 9A, and 9B depict measurement data of the present invention. Even if some of the waveforms of the wheel speeds are very close to each other, the effect induced by the feedforward voltage $V_{FF\_F}$, $V_{FF\_R}$ is obvious by reviewing the trend of the waveforms.

Figure 8A:
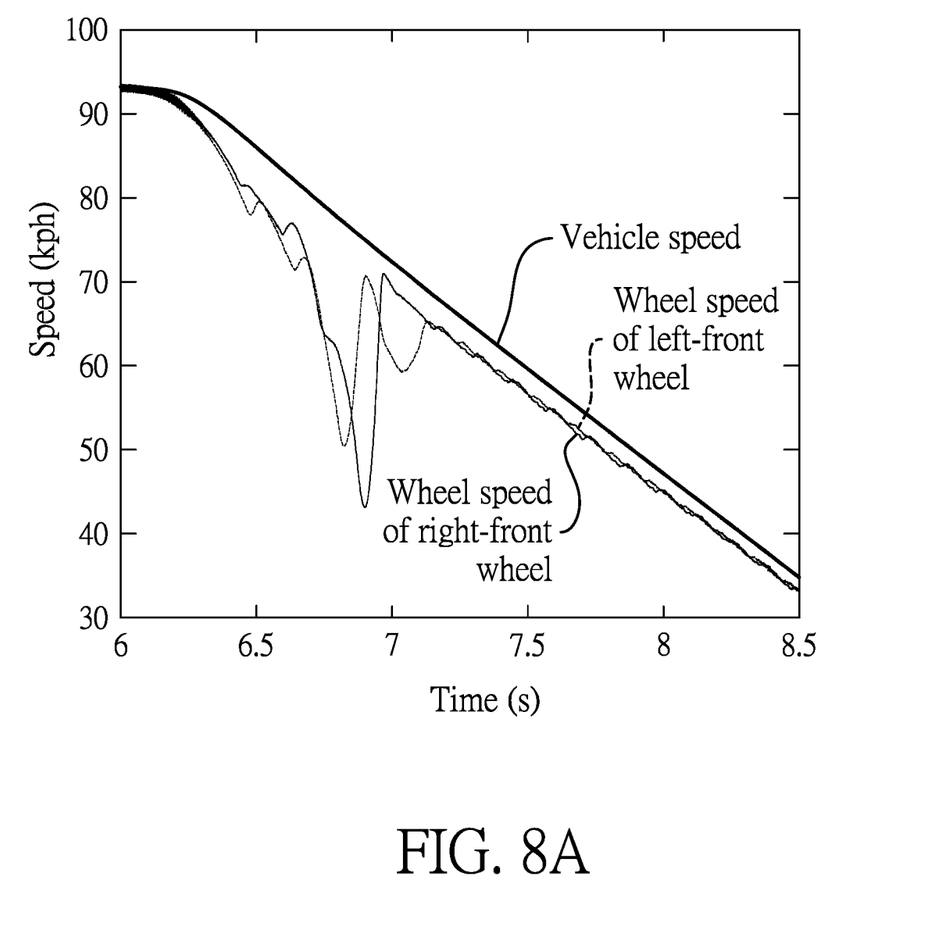
FIG. 8A is a waveform diagram including the vehicle speed, the wheel speed of the left-front wheel, and the wheel speed of the right-front wheel (when the braking control voltage does not include the feedforward voltage)
Figure 8B:
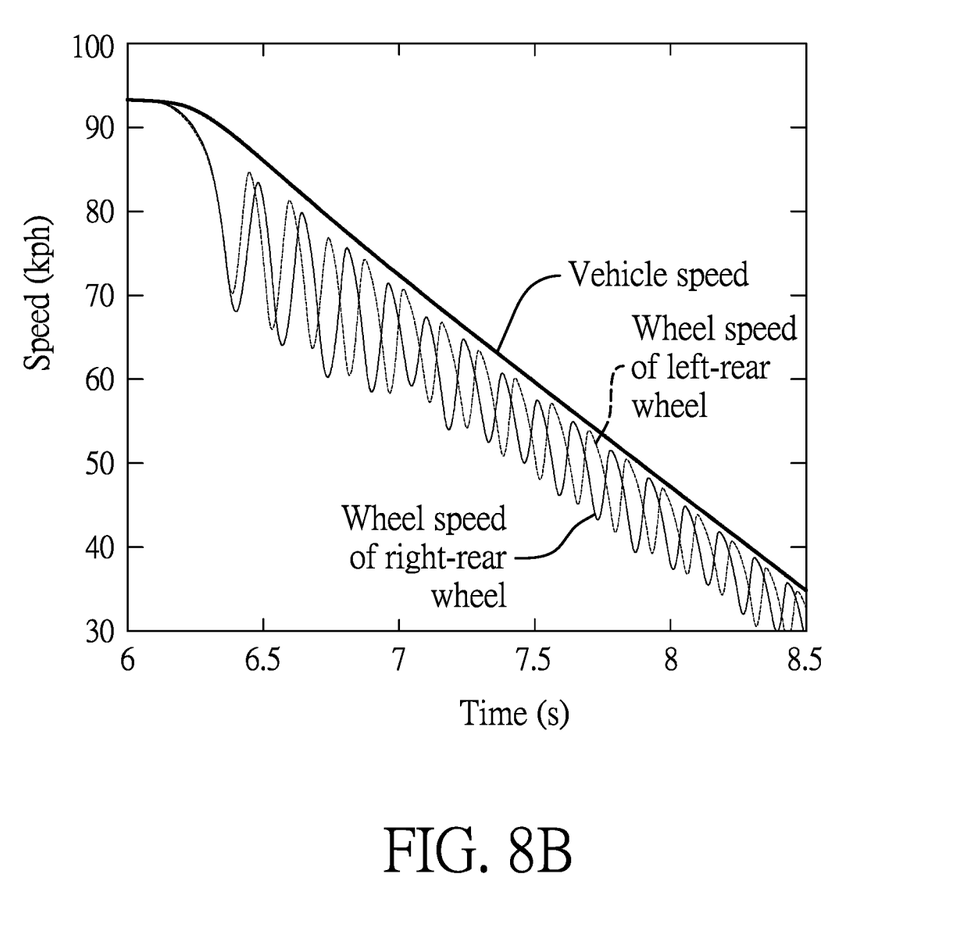
FIG. 8B is a waveform diagram including the vehicle speed, the wheel speed of the left-rear wheel, and the wheel speed of the right-rear wheel (when the braking control voltage does not include the feedforward voltage)

With reference to FIGS. 2, 8A, and 8B, the waveforms shown in FIGS. 8A and 8B are measured under a first braking event, such that the waveforms of the vehicle speed in FIGS. 8A and 8B are consistent to each other. Waveforms of the wheel speeds of the left-front wheel 21 and the right-front wheel 22 are shown in FIG. 8A. Waveforms of the wheel speeds of the left-rear wheel 23 and the right-rear wheel 24 are shown in FIG. 8B. In the first braking event, the braking control voltage $V_{P\_F}$, $V_{P\_R}$ does not include the feedforward voltage $V_{FF\_F}$, $V_{FF\_R}$. As shown in FIGS. 8A and 8B, the control module 13 intervenes the braking system of the vehicle 20 at about the 6th second, such that the vehicle speed of the vehicle 20 slows down from about 93 kph (kilometer-per-hour) as time goes on. With reference to FIG. 8A, the waveforms of the wheel speeds of the left-front wheel 21 and the right-front wheel 22 include high amplitudes between the 6.5th and 7th seconds, and the amplitudes become smaller at about the 7.2th second. With reference to FIG. 8B, the waveforms of the wheel speeds of the left-rear wheel 23 and the right-rear wheel 24 include higher amplitudes than those of the left-front wheel 21 and the right-front wheel 22 in general.

Figure 9A:
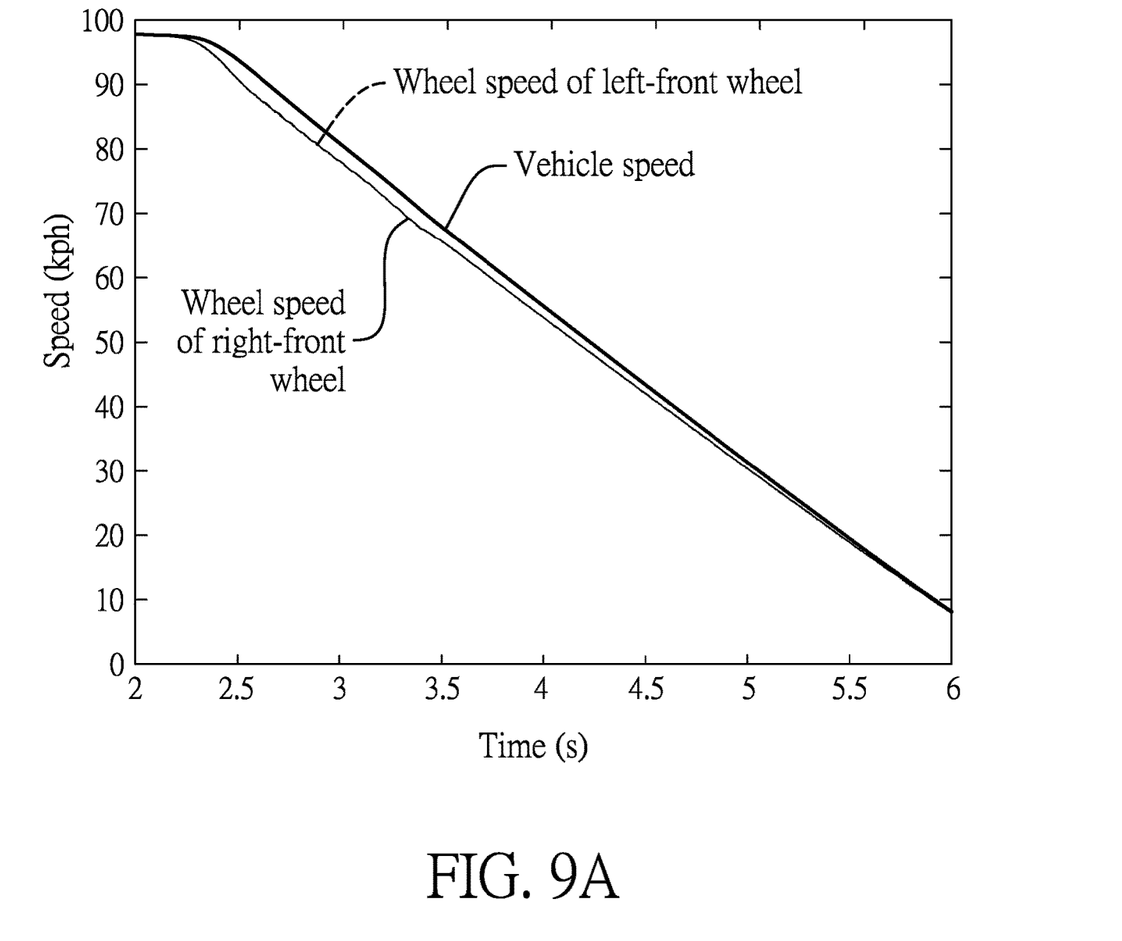
FIG. 9A is a waveform diagram including the vehicle speed, the wheel speed of the left-front wheel, and the wheel speed of the right-front wheel (when the braking control voltage includes the feedforward voltage)
Figure 9B:
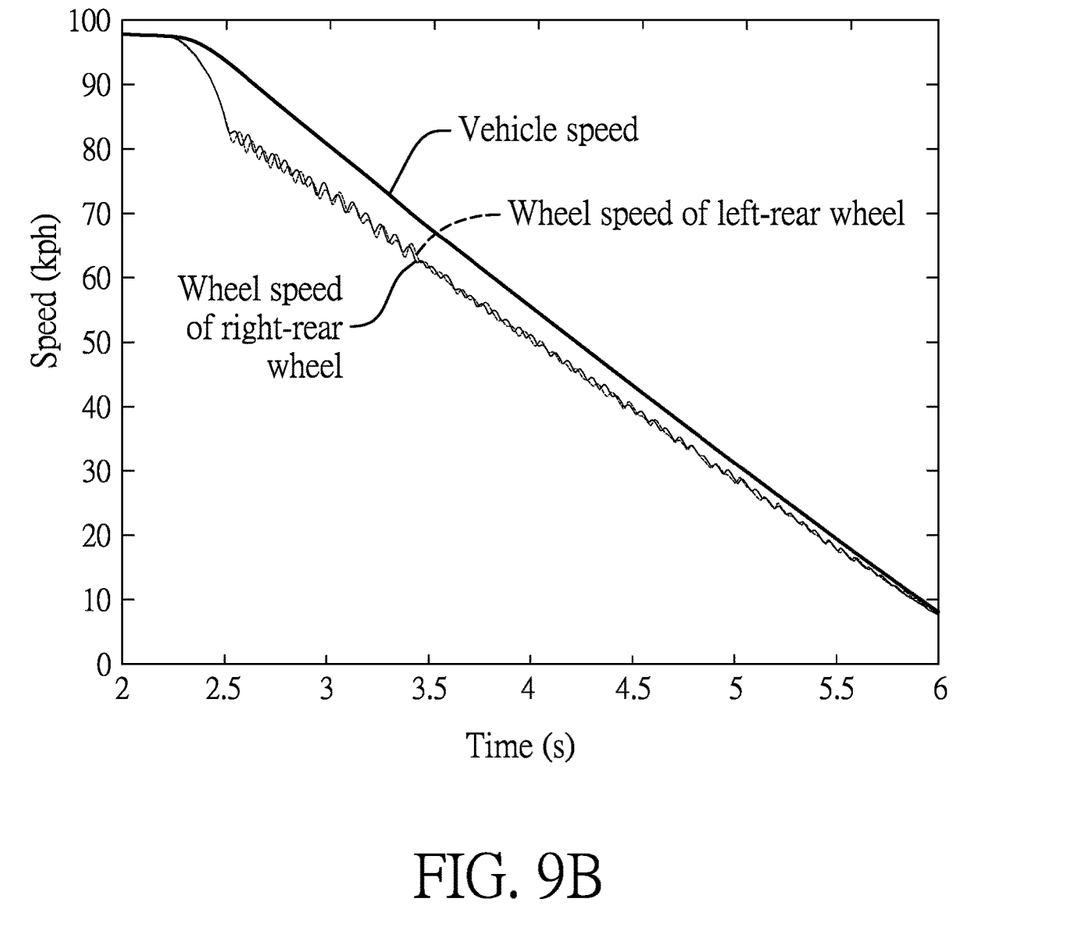
FIG. 9B is a waveform diagram including the vehicle speed, the wheel speed of the left-rear wheel, and the wheel speed of the right-rear wheel (when the braking control voltage includes the feedforward voltage)

With reference to FIGS. 2, 9A, and 9B, the waveforms shown in FIGS. 9A and 9B are measured under a second braking event, such that the waveforms of the vehicle speed in FIGS. 9A and 9B are consistent to each other. Waveforms of the wheel speeds of the left-front wheel 21 and the right-front wheel 22 are shown in FIG. 9A. Waveforms of the wheel speeds of the left-rear wheel 23 and the right-rear wheel 24 are shown in FIG. 9B. In the second braking event, the braking control voltage $V_{P\_F}$, $V_{P\_R}$ includes the feedforward voltage $V_{FF\_F}$, $V_{FF\_R}$. It is to be noted that the first braking event and the second braking event are different events, and therefore the braking control voltages in the two braking events are different to each other. As shown in FIGS. 9A and 9B, the control module 13 intervenes the braking system of the vehicle 20 at about the 2.4th second, such that the vehicle speed of the vehicle 20 slows down from about 97 kph as time goes on. The wheel speeds of the left-front wheel 21, the right-front wheel 22, the left-rear wheel 23, and the right-rear wheel 24 stably slow down as time goes on. Especially, the waveforms of the wheel speeds of the left front wheel 21 and the right-front wheel 22 are almost consistent to each other.

Compared with FIG. 8A, the wheel speeds in FIG. 9A do not include the high amplitude as the waveforms at the 6.5 to 7th seconds of FIG. 8A. Therefore, the feedforward voltage $V_{FF\_F}$, $V_{FF\_R}$ substantially overcomes a vibration phenomenon of the wheel speeds of the left-front wheel 21 and the right-front wheel 22. Furthermore, compared with FIG. 8B, the amplitudes of the waveforms of the left-rear wheel 23 and the right-rear wheel 24 in FIG. 9B are obviously decreased. In the present invention as a whole, for each one of the wheels, the control module 13 adds the feedback control voltage $V_B$ to the feedforward voltage $V_{FF}$ to obtain the braking control voltage $V_P$, such that the braking control voltage $V_P$ includes the voltage component of the feedforward voltage $V_{FF}$. By doing so, the feedforward voltage $V_{FF}$ provides an assistance to improve the vibration phenomenon of each one of the wheel speeds. As a result, the present invention may prevent the driver or the passengers from a feeling of intermittent and rapid vibrations, such that the driver or the passengers would not feel uncomfortable.

With reference to FIGS. 6 and 7, in the embodiment of the present invention, the second tire-slip upper limit $S_{U\_R}$ in FIG. 7 is lower than the first tire-slip upper limit $S_{U\_F}$ in FIG. 6, that is, the second feedforward voltage $V_{FF\_R}$ applying to the left-rear wheel 23 and the right-rear wheel 24 is higher under a lower tire slip status (such as 10% to 60%) than the first feedforward voltage $V_{FF\_F}$ applying to the left-front wheel 21 and the right-front wheel 22. As a result, the braking pressure relieved from the left-rear wheel 23 and the right-rear wheel 24 is greater (in other words, the braking pressure to the left-rear wheel 23 and the right-rear wheel 24 is smaller). In the present invention, the reason for setting the second tire-slip upper limit $S_{U\_R}$ to be lower than the first tire-slip upper limit $S_{U\_F}$ is described as follows. With reference to FIGS. 2, 9A, and 9B, compared with the left-front wheel 21 and the right-front wheel 22, when the left-rear wheel 23 and the right-rear wheel 24 are rapidly locked up, the tail of the vehicle 20 may swing left-and-right. By setting $S_{U\_R} < S_{U\_F}$ in the present invention, the braking pressures exerted on the left-rear wheel 23 and the right-rear wheel 24 are smaller than the braking pressures exerted on the left-front wheel 21 and the right-front wheel 22. Hence, under smaller braking pressures, the left-rear wheel 23 and the right-rear wheel 24 are prevented from being rapidly locked up, to efficiently stabilize the body of the vehicle 20 and to improve the swing phenomenon of the of tail of the vehicle 20.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An Anti-lock Braking System adapted to a vehicle with multiple wheels and comprising:
    an accelerometer outputting a vehicle acceleration signal reflecting acceleration of the vehicle;
    multiple wheel speed sensors respectively corresponding to the multiple wheels and each one of the wheel speed sensors outputting a wheel speed signal;
    multiple proportioning-valve brakes respectively corresponding to the multiple wheels and each one of the proportioning-valve brakes receiving a braking control voltage to adjust a braking pressure of each one of the wheels according to a magnitude of the braking control voltage; and
    a control module electrically connected to the accelerometer, the wheel speed sensors, and the proportioning-valve brakes; wherein after the control module intervenes a braking system of the vehicle, the control module generates the braking control voltages for the proportioning-valve brakes respectively according to the vehicle acceleration signal and the wheel speed signals;
    wherein the control module computes a tire-slip feedback value according to the wheel speed signal of each one of the wheel speed sensors and the vehicle acceleration signal, generates a feedback control voltage according to a tire-slip difference between a tire-slip target value and the tire-slip feedback value, generates a tire-slip compensation value by performing a differential compensation to the tire-slip feedback value, obtains a feedforward voltage according to the tire-slip compensation value via a look-up table approach, and generates the braking control voltage by adding the feedback control voltage to the feedforward voltage.

2. The Anti-lock Braking System of claim 1, wherein
    the control module stores multiple look-up tables for performing the look-up table approach;
    each one of the look-up tables includes a voltage lower limit, a voltage upper limit, a tire-slip lower-limit, and a tire-slip upper limit;
    when the tire-slip compensation value is between the tire-slip lower limit and the tire-slip upper limit, the tire-slip compensation value is linearly and directly proportional to the feedforward voltage.

3. The Anti-lock Braking System of claim 2, wherein
    the multiple wheels of the vehicle are multiple front wheels and multiple rear wheels;
    the multiple look-up tables are a first look-up table corresponding to the front wheels and a second look-up table corresponding to the rear wheels;
    the tire-slip upper limit in the first look-up table is defined as a first tire-slip upper limit, the tire-slip upper limit in the second look-up table is defined as a second tire-slip upper limit, and the second tire-slip upper limit is lower than the first tire-slip upper limit.

4. The Anti-lock Braking System of claim 3, wherein the tire-slip feedback value ($Slip_{FB}$) is represented as:

$$Slip_{FB} = \frac{V_{est} - W}{V_{est}}$$

wherein $V_{est}$ is the vehicle's speed and W is the wheel's speed computed from the wheel speed signal of each one of the wheel speed sensors.

5. The Anti-lock Braking System of claim 4, wherein the tire-slip compensation value ($Slip_{COMP}$) is represented as:

$$Slip_{COMP} = Slip_{FB} + C \times \frac{d}{dt}(Slip_{FB})$$

wherein C is a value of weight, $0 \leq C \leq 1$, and C for the front wheels is higher than C for the rear wheels.

6. An anti-lock braking control method performed after a control module intervenes a braking system of a vehicle with multiple wheels and comprising:

receiving a wheel speed signal of each one of the wheels and a vehicle acceleration signal;

computing a tire-slip feedback value according to the wheel speed signal of each one of the wheels and the vehicle acceleration signal;

generating a feedback control voltage according to a tire-slip difference between a tire-slip target value and the tire-slip feedback value;

generating a tire-slip compensation value by performing a differential compensation to the tire-slip feedback value;

obtaining a feedforward voltage according to the tire-slip compensation value via a look-up table approach;

generating a braking control voltage by adding the feedback control voltage to the feedforward voltage; and outputting the braking control voltage to a proportioning-valve brake, such that the proportioning-valve brake adjusts a braking pressure of each one of the wheels according to a magnitude of the braking control voltage.

7. The anti-lock braking control method of claim 6, wherein multiple look-up tables are adopted in the look-up table approach and each one of the look-up tables includes a voltage lower limit, a voltage upper limit, a tire-slip lower-limit, and a tire-slip upper limit; and when the tire-slip compensation value is between the tire-slip lower limit and the tire-slip upper limit, the tire-slip compensation value is linearly and directly proportional to the feedforward voltage.

8. The anti-lock braking control method of claim 7, wherein the multiple wheels of the vehicle are multiple front wheels and multiple rear wheels;

the multiple look-up tables are a first look-up table corresponding to the front wheels and a second look-up table corresponding to the rear wheels;

the tire-slip upper limit in the first look-up table is defined as a first tire-slip upper limit, the tire-slip upper limit in the second look-up table is defined as a second tire-slip upper limit, and the second tire-slip upper limit is lower than the first tire-slip upper limit.

9. The anti-lock braking control method of claim 8, wherein the tire-slip feedback value ($Slip_{FB}$) is represented as:

$$Slip_{FB} = \frac{V_{est} - W}{V_{est}}$$

wherein $V_{est}$ is the vehicle's speed and W is the wheel's speed computed from the wheel speed signal of each one of the wheels.

10. The anti-lock braking control method of claim 9, wherein the tire-slip compensation value ($Slip_{COMP}$) is represented as:

$$Slip_{COMP} = Slip_{FB} + C \times \frac{d}{dt}(Slip_{FB})$$

wherein C is a value of weight, $0 \leq C \leq 1$, and C for the front wheels is higher than C for the rear wheels.

\* \* \* \* \*